US009401080B2

(12) United States Patent
Rachamadugu

(10) Patent No.: US 9,401,080 B2
(45) Date of Patent: Jul. 26, 2016

(54) METHOD AND APPARATUS FOR SYNCHRONIZING VIDEO FRAMES

(75) Inventor: Sreenivas Rachamadugu, Leesburg, VA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 2297 days.

(21) Appl. No.: 11/617,263

(22) Filed: Dec. 28, 2006

(65) Prior Publication Data

US 2007/0107032 A1 May 10, 2007

Related U.S. Application Data

(63) Continuation-in-part of application No. 11/368,750, filed on Mar. 6, 2006, now Pat. No. 8,990,214.

(60) Provisional application No. 60/714,674, filed on Sep. 7, 2005.

(51) Int. Cl.
*G06F 15/16* (2006.01)
*G08B 13/196* (2006.01)

(52) U.S. Cl.
CPC ................................ *G08B 13/19613* (2013.01)

(58) Field of Classification Search
USPC .................. 709/202, 203; 725/115, 135, 145
See application file for complete search history.

(56) References Cited

U.S. PATENT DOCUMENTS

| | | | |
|---|---|---|---|
| 5,303,367 | A | 4/1994 | Leenstra et al. |
| 5,313,630 | A | 5/1994 | Namioka et al. |
| 5,499,371 | A | 3/1996 | Henninger et al. |
| 5,557,790 | A | 9/1996 | Bingham et al. |
| 5,611,076 | A | 3/1997 | Durflinger et al. |
| 5,612,715 | A | 3/1997 | Karaki et al. |
| 5,729,730 | A | 3/1998 | Wlaschin et al. |
| 5,790,176 | A | 8/1998 | Craig |
| 5,799,310 | A | 8/1998 | Anderson et al. |
| 5,831,669 | A | 11/1998 | Adrain |
| 5,845,073 | A | 12/1998 | Carlin et al. |
| 5,852,435 | A | 12/1998 | Vigneaux et al. |
| 5,864,870 | A | 1/1999 | Guck |

(Continued)

FOREIGN PATENT DOCUMENTS

| | | |
|---|---|---|
| EP | 0764951 | 3/1997 |
| EP | 1463058 | 9/2004 |

(Continued)

OTHER PUBLICATIONS

"Advanced Systems Format (ASF) Specification," Microsoft Corporation, Revision 01.20.02, http://download.microsoft.com/download/E/0/6/E06DB390-1E2A-4978-82BB-311810D8A28D/ASF_Specification.doc, 104 pages, Jun. 2004.

(Continued)

*Primary Examiner* — Esther B Henderson

(57) ABSTRACT

An approach is provided for synchronizing video frames. Video proxies corresponding to a video master are generated. Each of the video proxies is frame-accurate with respect to the video master. The video proxies are distributed to multiple applications and/or devices that are configured to collaboratively use the video proxies. The approach also allows the user to move a session from one device to another device, while preserving frame accuracy.

12 Claims, 11 Drawing Sheets

(56) References Cited

U.S. PATENT DOCUMENTS

| | | | | |
|---|---|---|---|---|
| 5,892,900 | A | 4/1999 | Ginter et al. | |
| 5,930,446 | A | 7/1999 | Kanda | |
| 5,956,424 | A | 9/1999 | Wootton et al. | |
| 5,980,044 | A | 11/1999 | Cannon et al. | |
| 6,026,408 | A | 2/2000 | Srinivasan et al. | |
| 6,047,291 | A | 4/2000 | Anderson et al. | |
| 6,069,627 | A | 5/2000 | Conrad et al. | |
| 6,092,154 | A | 7/2000 | Curtis et al. | |
| 6,151,622 | A * | 11/2000 | Fraenkel et al. | 709/205 |
| 6,211,869 | B1 | 4/2001 | Loveman et al. | |
| 6,222,549 | B1 | 4/2001 | Hoddie | |
| 6,226,038 | B1 | 5/2001 | Frink et al. | |
| 6,226,618 | B1 | 5/2001 | Downs et al. | |
| 6,246,803 | B1 | 6/2001 | Gauch | |
| 6,263,313 | B1 | 7/2001 | Milsted et al. | |
| 6,330,572 | B1 | 12/2001 | Sitka | |
| 6,404,446 | B1 | 6/2002 | Bates et al. | |
| 6,405,198 | B1 | 6/2002 | Bitar et al. | |
| 6,411,770 | B1 | 6/2002 | Ito et al. | |
| 6,519,571 | B1 | 2/2003 | Guheen et al. | |
| 6,522,418 | B2 | 2/2003 | Yokomizo et al. | |
| 6,573,907 | B1 | 6/2003 | Madrane | |
| 6,643,659 | B1 | 11/2003 | MacIssac et al. | |
| 6,658,568 | B1 | 12/2003 | Ginter et al. | |
| 6,678,002 | B2 | 1/2004 | Frink et al. | |
| 6,698,020 | B1 | 2/2004 | Zigmond et al. | |
| 6,714,594 | B2 | 3/2004 | Dimitrova et al. | |
| 6,721,490 | B1 | 4/2004 | Yao et al. | |
| 6,728,727 | B2 | 4/2004 | Komine et al. | |
| 6,732,183 | B1 | 5/2004 | Graham | |
| 6,795,506 | B1 | 9/2004 | Zhang et al. | |
| 6,865,540 | B1 | 3/2005 | Faber et al. | |
| 6,870,887 | B2 | 3/2005 | Kauffman et al. | |
| 6,917,979 | B1 | 7/2005 | Dutra et al. | |
| 6,934,339 | B2 | 8/2005 | Kato | |
| 6,947,959 | B1 | 9/2005 | Gill | |
| 6,961,445 | B1 | 11/2005 | Jensen et al. | |
| 6,970,510 | B1 | 11/2005 | Wee et al. | |
| 7,168,086 | B1 * | 1/2007 | Carpenter et al. | 725/98 |
| 7,177,520 | B2 | 2/2007 | Zetts | |
| 7,310,111 | B2 | 12/2007 | Ramirez-Diaz et al. | |
| 7,409,144 | B2 | 8/2008 | McGrath et al. | |
| 7,505,604 | B2 | 3/2009 | Zakrzewski et al. | |
| 7,522,163 | B2 | 4/2009 | Holmes | |
| 7,577,959 | B2 | 8/2009 | Nguyen et al. | |
| 7,629,995 | B2 | 12/2009 | Salivar et al. | |
| 7,650,625 | B2 | 1/2010 | Watkins | |
| 7,676,820 | B2 | 3/2010 | Snijder et al. | |
| 7,782,365 | B2 | 8/2010 | Levien et al. | |
| 7,783,154 | B2 | 8/2010 | Wilkins et al. | |
| 7,902,978 | B2 | 3/2011 | Pederson | |
| 7,952,609 | B2 | 5/2011 | Simerly et al. | |
| 8,135,852 | B2 | 3/2012 | Nilsson et al. | |
| 2001/0034250 | A1 | 10/2001 | Chadha | |
| 2001/0051927 | A1 | 12/2001 | London et al. | |
| 2002/0035732 | A1 | 3/2002 | Zetts | |
| 2002/0046292 | A1 | 4/2002 | Tennison et al. | |
| 2002/0052771 | A1 | 5/2002 | Bacon et al. | |
| 2002/0056123 | A1 | 5/2002 | Liwerant et al. | |
| 2002/0069218 | A1 | 6/2002 | Sull et al. | |
| 2002/0108115 | A1 | 8/2002 | Palmer | |
| 2002/0122659 | A1 | 9/2002 | McGrath et al. | |
| 2002/0145622 | A1 | 10/2002 | Kauffman et al. | |
| 2002/0194253 | A1 | 12/2002 | Cooper et al. | |
| 2003/0001885 | A1 | 1/2003 | Lin et al. | |
| 2003/0005034 | A1 | 1/2003 | Amin | |
| 2003/0018978 | A1 | 1/2003 | Singal et al. | |
| 2003/0025599 | A1 | 2/2003 | Monroe | |
| 2003/0044162 | A1 | 3/2003 | Angel | |
| 2003/0084451 | A1 | 5/2003 | Pierzga et al. | |
| 2003/0088877 | A1 | 5/2003 | Loveman et al. | |
| 2003/0135464 | A1 | 7/2003 | Mourad et al. | |
| 2003/0188019 | A1 | 10/2003 | Wesley | |
| 2003/0229900 | A1 | 12/2003 | Reisman | |
| 2004/0017471 | A1 | 1/2004 | Suga et al. | |
| 2004/0059996 | A1 | 3/2004 | Fasciano | |
| 2004/0098754 | A1 * | 5/2004 | Vella et al. | 725/135 |
| 2004/0131330 | A1 | 7/2004 | Wilkins et al. | |
| 2004/0133467 | A1 | 7/2004 | Siler | |
| 2004/0136590 | A1 | 7/2004 | Brouwer | |
| 2004/0153504 | A1 | 8/2004 | Hutchinson et al. | |
| 2004/0168184 | A1 | 8/2004 | Steenkamp et al. | |
| 2004/0210823 | A1 | 10/2004 | Miura et al. | |
| 2004/0216173 | A1 * | 10/2004 | Horoszowski et al. | 725/145 |
| 2004/0223606 | A1 | 11/2004 | Enete et al. | |
| 2004/0247284 | A1 | 12/2004 | Yamasaki | |
| 2004/0255329 | A1 | 12/2004 | Compton et al. | |
| 2004/0268222 | A1 | 12/2004 | Kawa et al. | |
| 2004/0268224 | A1 | 12/2004 | Balkus et al. | |
| 2005/0005000 | A1 | 1/2005 | Yoshimoto | |
| 2005/0019005 | A1 | 1/2005 | Kim et al. | |
| 2005/0049886 | A1 | 3/2005 | Grannan et al. | |
| 2005/0073585 | A1 | 4/2005 | Ettinger et al. | |
| 2005/0074100 | A1 | 4/2005 | Lederman | |
| 2005/0091311 | A1 | 4/2005 | Lund et al. | |
| 2005/0149940 | A1 | 7/2005 | Calinescu et al. | |
| 2005/0185634 | A1 | 8/2005 | Benco et al. | |
| 2005/0195823 | A1 * | 9/2005 | Chen et al. | 370/395.1 |
| 2005/0198125 | A1 | 9/2005 | Macleod Beck et al. | |
| 2005/0210520 | A1 | 9/2005 | Horvitz et al. | |
| 2005/0262535 | A1 | 11/2005 | Uchida et al. | |
| 2005/0262542 | A1 | 11/2005 | Deweese et al. | |
| 2005/0278425 | A1 | 12/2005 | Wilsher et al. | |
| 2006/0047749 | A1 * | 3/2006 | Davis et al. | 709/204 |
| 2006/0056732 | A1 | 3/2006 | Holmes | |
| 2006/0143686 | A1 | 6/2006 | Maes | |
| 2006/0146184 | A1 | 7/2006 | Gillard et al. | |
| 2006/0156219 | A1 | 7/2006 | Haot et al. | |
| 2006/0161635 | A1 | 7/2006 | Lamkin et al. | |
| 2006/0205362 | A1 | 9/2006 | Chang et al. | |
| 2006/0236221 | A1 | 10/2006 | McCausland et al. | |
| 2006/0259589 | A1 | 11/2006 | Lerman et al. | |
| 2006/0263039 | A1 | 11/2006 | Chiang | |
| 2006/0274828 | A1 | 12/2006 | Siemens et al. | |
| 2007/0006177 | A1 | 1/2007 | Aiber et al. | |
| 2007/0022404 | A1 | 1/2007 | Zhang et al. | |
| 2007/0043860 | A1 | 2/2007 | Pabari | |
| 2007/0043875 | A1 | 2/2007 | Brannon | |
| 2007/0113184 | A1 | 5/2007 | Haot et al. | |
| 2008/0043106 | A1 | 2/2008 | Hassapis | |
| 2008/0320599 | A1 | 12/2008 | Raley et al. | |

FOREIGN PATENT DOCUMENTS

| | | |
|---|---|---|
| EP | 1864229 | 12/2007 |
| JP | 2000-341635 | 12/2000 |
| JP | 2001-346164 | 12/2001 |
| JP | 2004-088384 | 3/2004 |
| JP | 2004-320667 | 11/2004 |
| WO | 97/15018 | 4/1997 |
| WO | 97/39411 | 10/1997 |
| WO | 00/29980 | 5/2000 |
| WO | 02/01384 | 1/2002 |
| WO | 2005/027068 | 3/2005 |

OTHER PUBLICATIONS

"Avipreview Frequently Asked Questions", pp. 1-7, Retrieved from the internet: URL:http://www.avipreview.com/faq.htm [retrieved Jan. 21, 2009], Oct. 15, 2002.

Bolle, et al., "Video Libraries: From Ingest to Distribution," IBM T. J. Watson Research Center, Lecture Notes in Computer Science vol. 1614, pp. 15-18, DOI:10.1007/3-540-48762-X_2, Dec. 1999.

David, "News Technology: The Cutting Edge," Appears in Capturing the Action: Changes in Newsgathering Technology, IEEE Colloquium, pp. 4/1-4/8, Oct. 27, 1995.

Gordon-Till, "My Opinion Is, Opinions Are Useful," Information World Review, Issue 184, four pages, Oct. 2002.

* cited by examiner

800

METHOD AND APPARATUS FOR SYNCHRONIZING VIDEO FRAMES

RELATED APPLICATIONS

This application is a continuation-in-part of U.S. patent application (Ser. No. 11/368,750;), filed Mar. 6, 2006, entitled "Method and System for Providing Distributed Editing and Storage of Digital Media over a Network," which claims the benefit of the earlier filing date under 35 U.S.C. §119(e) of U.S. Provisional Patent Application (Ser. No. 60/714,674;), filed Sep. 7, 2005, entitled "Method and System for Supporting Media Services"; the entireties of which are incorporated herein by reference.

BACKGROUND INFORMATION

The media or broadcast industry has traditionally been confined to technologies that are expensive and an inflexible with respect to editing, production and delivery of media (e.g., video). By contrast, the communications affords great flexibility in terms of providing users with alternative networks and rich communication and entertainment services. In addition, the cost of equipment, from networking elements to end user equipment, follows a downward trend as advancements are made; for example, cellular phones are ubiquitous because of their affordability. The capabilities of these devices continue to evolve at a rapid pace; e.g., cellular phones are now equipped with high resolution displays and advanced processors to support sophisticated applications and services. Further, broadband data communications services have enabled transmission of bandwidth intensive applications, such as video broadcasts (e.g., web casts). In adopting these advances in communication technologies, the media industry faces a number of challenges. For instance, the issue of convergence of a broadband rich media experience and live television production and delivery needs to be addressed. Also, the demands of supporting real-time news, video on demand, user personalization, and continuing creative additions to initial systems pose additional engineering challenges. Further, delivery of interactive media (which describe real events in the real world in real-time) requires the capability to quickly acquire, store, edit, and composite live and other descriptive media by numerous users, e.g., editors, artists, and producers. Given this backdrop, one area of interest concerns providing a collaborative environment across a diversity of communication equipment and services. Traditionally, no mechanism exists for permitting manipulation of interactive media, such as video, in a collaborative fashion, largely because conventional systems have not permitted the distribution of video over different devices and media. Further, under such circumstances, synchronization of the video frames is difficult.

Based on the foregoing, there is a clear need for approaches that enable effective collaboration.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus, method, and software for providing frame synchronization are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various embodiments of the present invention are described with respect to the Motion Picture Expert Group (MPEG) standards, MICROSOFT Windows Media, and Group of Pictures (GOP) technologies, it is contemplated that these embodiments have applicability to other equivalent video encoding standards and technologies.

Figure 1:
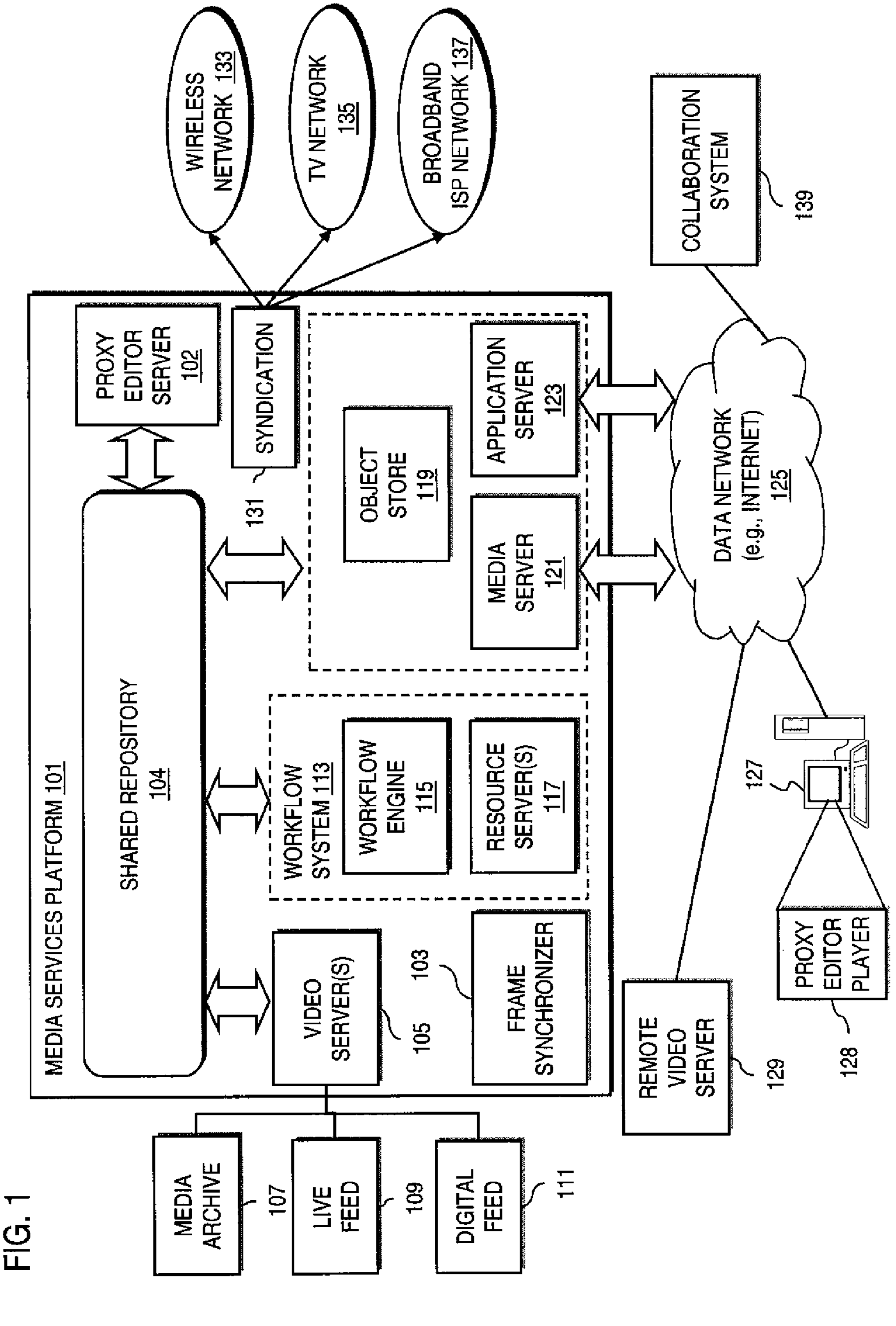
FIG. 1 is a diagram of a media services platform for providing synchronization of interactive media, according to an exemplary embodiment.

FIG. 1 is a diagram of a media services platform for providing synchronization of interactive media, according to an exemplary embodiment. The media services platform 101 provides an integrated media asset management platform with a fully modular architecture that enables users (e.g., customers, subscribers, etc.) to deploy the platform on a module-by-module basis as well as workflow-by-workflow. Media asset management functions include archiving, mastering of long-form content for video-on-demand (VOD) distribution, digital content aggregation and distribution. The platform 101 also supports remote proxy editing using a proxy editing application as executed by a proxy editor server 102, thereby permitting fast-turnaround broadcast productions. The editing application utilizes low-resolution version of the video content (i.e., "video proxy") for the purposes of editing; hence, the editing application is referred to as a "proxy editor."

The media services platform 101 enables multi-channel distribution of digital content to any variety and number of devices and networks—e.g., wireless mobile devices, broadband, Internet Protocol Television (IPTV), and traditional TV platforms—thereby, reducing costs and increasing revenue over conventional systems. The architecture of the media services platform 101, according to an exemplary embodiment, supports compact to enterprise-scale deployments, and ensures that storage and processing capabilities are robust and scalable, suitable for mission-critical broadcast operations. As will be more fully described, numerous video proxies can be generated and syndicated to multiple applications and/or devices in a collaborative environment. This capability to collaborate is enabled through a frame synchronizer 103, which ensures that the video proxies are aligned during a collaboration session. This process is more fully described with respect to FIGS. 6-9.

It is recognized that there is an increasing need for professional, cost-effective editing of video feeds, such as television coverage of news or entertainment events, wherein the edited files can be provided over different alternative networks. For example, a user of a video enabled mobile cellular telephone might subscribe to a service that provides highlights of selected sporting events. Similarly, a user might subscribe to a sports headlines service, and receive files on a computer connected to a public data network, such as the global Internet. The real time delivery of events such as sports footage, interviews and edited highlights presents problems in such contexts, where it is necessary to produce compressed files to reduce the bandwidth for transmission over a cellular telephone network or a data network. Video files for such purposes need to be produced in an encoded format using, for instance, Group of Picture (GOP) technology, otherwise the raw digital stream would render timely transmissions and file storage impractical.

Thus, a video stream is created to include a sequence of sets of frames (i.e., GOP). By way of example, each group, typically 8 to 24 frames long, has only one complete frame represented in full. This complete frame is compressed using only intraframe compression, and thus is denoted as an I frame. Other frames are utilized and include temporally-compressed frames, representing only change data with respect to the complete frame. Specifically, during encoding, motion prediction techniques compare neighboring frames and pinpoint areas of movement, defining vectors for how each will move from one frame to the next. By recording only these vectors, the data which needs to be recorded can be substantially reduced. Predictive (P) frames refer to the previous frame, while Bi-directional (B) frames rely on previous and subsequent frames. This combination of compression techniques is highly effective in reducing the size of the video stream.

With GOP systems, an index is required to decode a given frame. Conventionally, the index is only written at the end of the file once the file has completed the encoding process. As a result, no index is available until the recording is completed. The implication is that the production of an edited version of the file, for example to transmit as highlights over a cellular phone network, cannot commence until the recording is completed and this index file produced. The media services platform 101 addresses this drawback by creating a separate index file, which can be supplemental to the routinely generated index file, during the recording and encoding process.

Accordingly, the platform 101, in an exemplary embodiment, can provide remote editing over any data network (e.g., Internet Protocol (IP)-based) that can support connectivity to the proxy editor server 102, whereby editing can commence without having to wait for completion of the recording. The proxy editor application resident on the server 102 enables developers to build professional-level desktop video editing applications using, for example, the Microsoft Windows Media Series platform.

The platform 101 also provides significant scalability due to decoupled storage. Conventional editing systems required direct disk access to the video file. This poses a severe scalability issue, as every editing function (e.g., play, scrub, etc.) from the editing client creates disk traffic. If the storage cannot timely respond, a conventional editing application often freezes or crashes, such a scenario is unacceptable for real time feeds. With the media services platform 101, the content is downloaded once on each client cache; thus, the centralized storage requirements are reduced by a very significant factor (depending on editing type).

As seen in FIG. 1, the media services platform 101 utilizes a shared repository 104 that stores media (e.g., digitized video) content ingested from one or more video servers 105. Ingesting involves obtaining content into the media services platform 101, and can be accomplished locally or from a remote location. In an exemplary embodiment, the repository 104 is deployed as a shared Storage Area Network (SAN) or NAS (Network Area Storage), which has the capability for high-performance video ingest and playback. The shared SAN 104 can utilize scalable Fibre Channel switch fabric to interface with a Fibre Channel disk array and nearline tape libraries. The video servers 105, as will be more fully described in FIG. 3, can interface any type of content sources, such as a media archive 107, a live feed 109, or a digital feed 111.

The media services platform 101 includes a workflow system 113, which comprises a workflow engine 115 and one or more resource servers 117 to support editing and distribution of digital media. The automated workflow provides the ability to automate and orchestrate repetitive workflows. In particular, the workflow system 113 offers users an overview of their work and associated events; that is, the system 113 supports an application that shows the status and progress of each job and links to relevant applications that enable the users to perform their tasks and advance the project towards completion. The workflow engine 115 controls workflow jobs and dispatches them to the resource servers 117. Communication among the resource servers 117 is facilitated by, for example, Microsoft Message Queuing.

In addition to providing individual users a central point for managing their work, the workflow system 113 is also useful as a monitoring system. For example, the system 113 can support a graphical user interface (GUI) on the user side, such that users can quickly determine through visual indicators whether tasks have been completed or error conditions exist. The users (e.g., administrators) can "drill down" to view more detail. Also, jobs can be paused, restarted (from any stage), aborted and deleted from the workflow application. This capability provides users with full control over the priority of the jobs. Additionally, the system 113 can record timing information for every step of a task, thereby enabling generation of reports on delivery turnaround etc.—e.g., for Service Level Agreement (SLA) reporting.

According to an exemplary embodiment, the media services platform 101 can be implemented with a pre-configured, standard set of common workflows. For instance, these workflows can support generic delivery of files, rendering of edits and delivery of content from the video server 105. Moreover, customizable workflows are supported, wherein the users can integrate new services.

As shown, the media services platform 101 comprises core servers, such as an object store 119, a media server 121, and an application server 123. In an exemplary embodiment, the object store 119 contains configuration information for the workflow system 113. Configuration information include, in an exemplary embodiment, parameters of every service, the capabilities of every resource server 117, the definition of workflows, and the real time status of every job. The object store 119 supports the various applications that interface with it through an object store Application Program Interface (API). According to an exemplary embodiment, the object store 119 has an object-based database schema (e.g., Microsoft SQL (Structured Query Language) Server, for example. The media server 121 receives stream broadcasts and serves the stream on to individual user workstations using, for example, Microsoft Windows Media. The stream contains, for example, Society of Motion Picture and Television Engineers (SMPTE) timecode, enabling the stream to be used as a frame-accurate source for live logging.

The application server 123 provides dynamic web site creation and administration functions, such as a search engine, and database capabilities. In an exemplary embodiment, the application server 123 executes Microsoft Internet Information Server (IIS), and can be configured for high availability and load-balancing based on industry standard components.

The media server 121 and the application server 123 interface with the data network 125, which can be a corporate network or the Internet. The application server 123 is thus accessible by a workstation 127, which can be any type of computing device—e.g., laptop, web appliance, palm computer, personal digital assistant (PDA), etc. The workstation 127 can utilize a browser (e.g., web-based), generally, to communicate with the media services platform 101, and a downloadable applet (e.g., ActiveX controls) to support distributed video editing functionality. The browser in conjunction with the applet is referred to an editing (or editor) interface—e.g., the proxy editor player 128. The workstation 127 can also be equipped with voiceover microphone and headphones to facilitate the editing process. The proxy editor player 128 communicates with the proxy editor server 102 to enable the viewing and editing of content, including live video, remotely. Editing functionalities include immediate access to frame-accurate content, even while being recorded, full audio and video scrubbing of source clips and edit timelines over the network 125, and generation of Advanced Authoring Format/Edit Decision List (AAF/EDL) files for craft edit integration.

To connect to the media services platform 101, the workstation 127 need not require special hardware or software. As mentioned, the workstation 127 need only be configured to run a browser application, e.g., Internet Explorer, for communication over the data network 125. With this user interface, changes or upgrades to the workstation 127 are not required, as all the applications are hosted centrally at the platform 101.

In addition to the video server 105 within the media services platform 101, a remote video server 129 can be deployed to ingest content for uploading to the platform 101 via the data network 125. The video servers 105, 129 include, in an exemplary embodiment, a longitudinal timecode (LTC) reader card as well as other video interfaces (e.g., RS-422 control card, Windows Media Encoder and Matrox DigiServer video card). Video editing relies on the use of timecodes to ensure precise edits, capturing all in "in points" and "out points" of the edits. An edited video can be characterized by an edit decision list (EDL), which enumerates all the edits used to produce the edited video. LTC timecodes are recorded as a longitudinal track, analogous to audio tracks. With LTC, each frame time is divided into 80 bit cells. LTC timecodes are transmitted serially in four-bit nibbles, using Manchester codes.

The video servers 105, 129 can be remotely controlled by the workstation 127. Also, these servers 105, 129 can connect to the shared SAN 104 via Fibre Channel and a file system by, e.g., ADIC™.

A syndication (or distribution) function 131 can then distribute content over various channels, such as a wireless network 133 (e.g., cellular, wireless local area network (WLAN)), a television network 135, and a broadband Internet Service Provider (ISP) network 137. Depending on the capabilities supported by the wireless or wired access network (e.g., networks 133 and 137), rich services, such as presence, events, instant messaging (IM), voice telephony, video, games and entertainment services can be supported.

The syndication function 131 automates the creation and delivery of content and metadata to very specific standards for a range of target systems without manual intervention. Additionally, the syndication function 131 can operate in conjunction with a collaboration service for delivery of the information to the GUI of FIG. 8, for example. In an exemplary embodiment the collaboration service is provided by the media services platform 101; alternatively, the service can be external to the platform 101 as a standalone collaboration system 139.

Although the video server 105, the workflow engine 115, the object store 119, the media server 121, and the application server 123 are shown as separate components, it is recognized that the functions of these servers can be combined in a variety of ways within one or more physical component. For example, the object store 119, the application server 123, and the workflow engine 115 can reside within a single server; and the video server 105 and the media server 121 can be combined into a common server.

As mentioned above, the media services platform 101 enables media asset management, rapid production, and robust, cost-effective proxy editing capabilities. By way of illustration, management of media assets to support broadband video on demand (VOD) is described. One of the first tasks involved with VOD applications is ingesting fall length movies into the video servers 105 for mastering and editing (e.g., removing black, stitching tapes together, adding legal notices etc). The masters are then stored on the shared SAN 104. The content is then transcoded to a high quality media stream format, such as Microsoft Windows Media Series, and delivered automatically with metadata to their broadband video pay-per-view portal (e.g., any one or more of the networks 133, 135 and 137).

Additionally, the media services platform 101 can offer video archiving services. For instance, customers can extend their online storage with nearline tape and manage content seamlessly across multiple storage devices using add-on archive modules. Online storage can be backed up and/or migrated to tape according to automated policies. Advantageously, this archival approach can be transparent to the users; that is, the users are never aware that the master video is no longer stored on expensive disk-based storage. In an embodiment, a library application can be implemented with the media services platform 104 to provide seamless integration with offline video and data tape archives. Further, the media services platform 101 provides high integration with existing production workflows through its capability to transcode and deliver any content contained in the archive to, for example, popular non-linear editors (e.g., AVID™ editor).

Furthermore, the media services platform 101 enables flexible, cost-effective content aggregation and distribution, which is suitable for content service providers. Typical workflows involve aggregation of content from owners in such formats as Motion Pictures Expert Group (MPEG)-2 or Windows Media, along with metadata in eXtensible Markup Language (XML) files, using pre-configured File Transfer Protocol (FTP) hot folders. "Hot folders" are predefined folders that trigger a workflow event (e.g., file conversion, compression, file transfer, etc.) upon movement of files into the folder. These owners can submit content directly to the workflow system 113 for automatic transcoding, Digital Rights Management (DRM) protection and syndication to multi-channel operators.

According to an exemplary embodiment, the media services platform 101 utilizes a unified user interface (e.g., web browser) for accessing applications supported by the platform 101. It is recognized that typical production and content delivery workflows often involve the use of multiple separate applications: one application for logging, a second application for encoding, a third one for editing, a fourth application for asset management, and so on. Consequently, the challenge of effectively managing workflows is difficult. The task is even more daunting in a multi-channel production and distribution environment, as greater elements need to coordinated and more applications have to be learned over traditional television environments.

The media services platform 101 advantageously simplifies this task by permitting access to the multitude of applications via a single unified user interface as part of a coherent workflow. In this manner, although various technologies are involved, the user experience is that of a single, user-friendly suite of tools, which shield non-technical users from the complex integration of applications and technologies.

The applications supported by the platform 101 include the following: media asset management and search, video editing, video server services, workflow, syndication, upload of media, library service, administration, quality assurance, copyright protection, music cue sheet services, and reporting. In addition, the users can develop their own applications within the unified user interface. Asset management permits users to manage the location of content within organized folder structures and categories. The asset search function offers a generic search capability across the entire object store 119.

The media services platform 101 also provides a flexible and cost-effective approach for proxy logging and editing of live and archive material. Such editing services can be in support of news and sport editing, archive browsing and editing, mobile, broadband and IPTV production and mastering, and promotion production. The editing application provides viewing and logging of live feeds, frame-accurate proxy logging and editing, and remote proxy editing (e.g., utilizing Windows Media Series proxy format). In addition, the editing application can support instant logging and editing while the feed is recording, as well as audio and video scrubbing. This editing application includes the following capabilities: edit timeline with effects; voiceover (while editing remotely—which is ideal for translation workflows); save edit projects with versions; generate thumbnail and metadata from within the editing user interface; and export EDL's or render finished edits ready for transcoding and delivery. With this application, a user, through an inexpensive workstation 127, can efficiently master a movie for VOD distribution, rough-cut a documentary, or create a filly-finished sports highlight video with voiceover and effects.

The media services platform 101, in an exemplary embodiment, utilizes a Windows Media Series codec, which allows high quality video (e.g., DVD-quality) to be logged and edited across the data network 125. Further, the platform 101 employs intelligent caching to ensure that the applications are as responsive as editing on a local hard drive, even over low-bandwidth connections.

The upload application allows users to ingest digital files into the media services platform 101 and submit them to any permitted workflow. The users (with administrative responsibilities) can control which file types are allowed, which workflows are compatible, and the way in which different types of content are processed. The upload application can facilitate submission of the files to automatic workflows for hands-off end-to-end processing as well as to manual workflows that require manual intervention.

The upload application is complemented by a hot folder system, wherein workflow activities are automatically initiated upon movement of files into and out of the hot folders. The file system folders can be pre-configured to behave like the upload application and pass files of particular types to the workflows. Metadata for each asset provided in accompanying XML files can be acquired and mapped directly into the object store 119.

The reporting application enables users to create "printer-friendly" reports on any information stored in the object store 119. The reporting application is pre-configured with a number of default reports for reporting on content delivery. Users can filter each report by selecting a desired property of the data, e.g., subscription name, or start and end date. Through the API of the media services platform 101, users (and system integrators) can create new report templates and queries.

The library application offers the ability to manage physical media that contain instances of assets managed in the media services platform 101. Even with continuing expansion in the use of digital media, traditional media continue to play an important role. Typical production environments possess a number of video tapes, DVDs or other physical media for storing content and data. Some environments utilize large established archives.

In mixed media environments, it is beneficial to manage digital and physical instances of content in an integrated manner. Accordingly, the library application provides the following capabilities. For example, the application permits the user to generate and print barcodes for the physical media and shelves, with automatic naming as well as bulk naming (with configurable naming conventions). Also, barcodes are employed for common actions, thereby allowing completely keyboard-free operation for checking in/out and shelving of the physical media. The library application additionally can manage items across multiple physical locations, e.g., local and master libraries. Further, the application supports PDA-based applications with a barcode scanner for mobile checking in/out and shelving. The library application advantageously simplifies management of multiple copies of the same asset on several physical media and storage of multiple assets on the same tape or DVD. The library application can further be used in conjunction with robotic tape libraries to track tapes that have been removed and shelved.

Moreover, the media services platform 101 provides an administration function to tailor system configuration for different customers. It is recognized that a "one size fits all" configuration for all users is non-existent. That is, each user, department, organization and customer has its own set of requirements. Therefore, the media services platform 101 supports concurrent use of multiple configurations. For example, each deployment can configure to its own user groups, create new workflows, integrate new services, support new content types, and specify new output media formats. The customer can also change and add metadata structures and fields, and integrate existing web-based applications into the user interface. The above capabilities can be executed, via the administration application, with immediate effect without shutting down the platform 101. Additionally, in a multi-department deployment scenario, multiple logical instances of the media services platform 101 can be configured with their own unique configurations.

According to an exemplary embodiment, the media services platform 101 can be implemented as a turn-key system within a single box—e.g., in-a-box flight case. Under this configuration, there is no need for a costly and time-consuming IT (information technology) integration undertaking to rack the components or integrate them into the customer's network. Under this arrangement, the platform 101 is be configured as a plug-and-play system, connecting to the network automatically.

Figure 2:
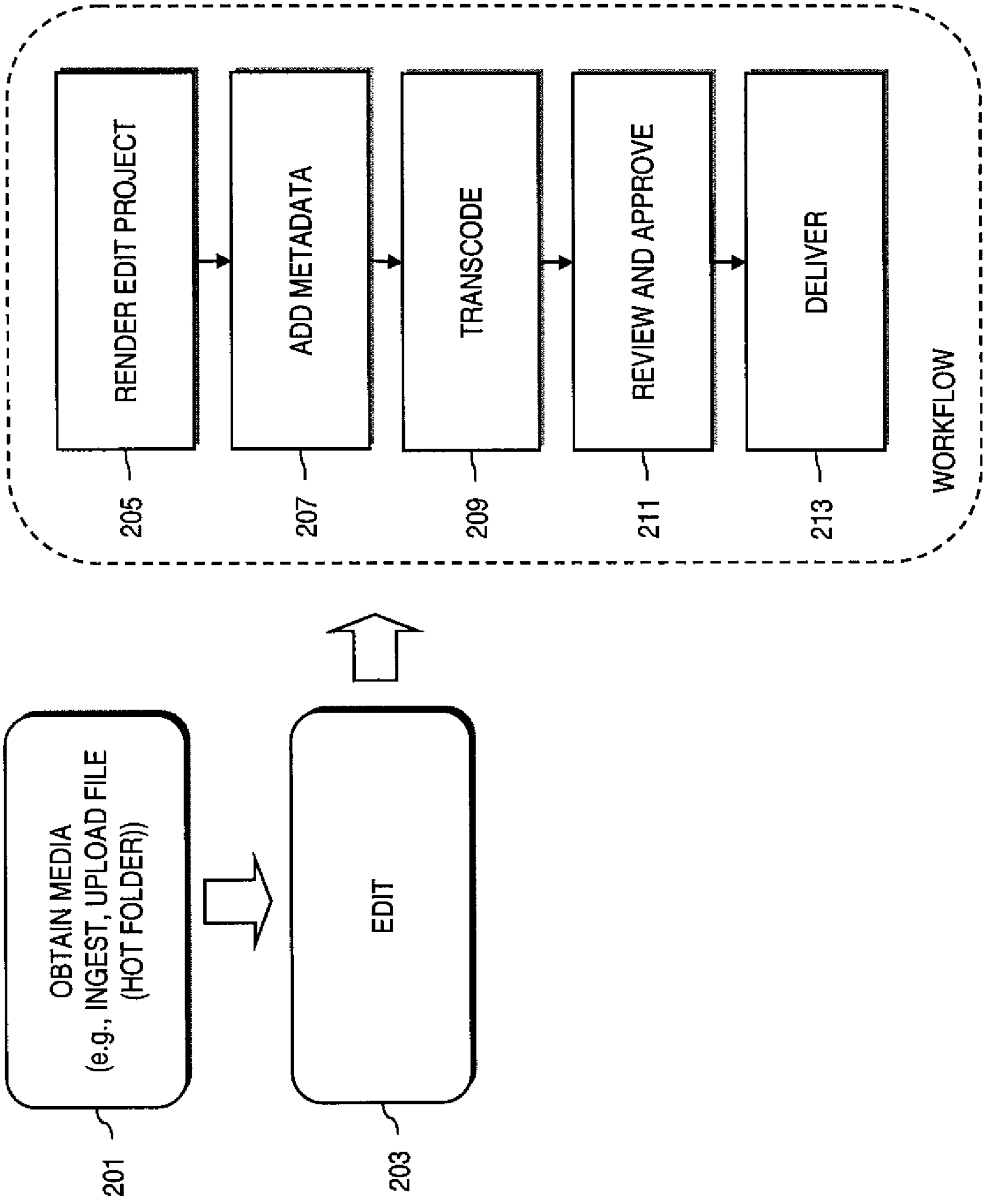
FIG. 2 is a diagram of a workflow process utilized in the system of FIG. 1 to edit digital media, according to an exemplary embodiment.

FIG. 2 is a diagram of a workflow process utilized in the system of FIG. 1 to edit digital media, according to an exemplary embodiment. For the purposes of explanation, the workflow capability of the media services platform 101 is described with respect to the video editing application. In step 201, the media that is to be edited is obtain; the media can undergo an ingest process or simply exists as a digital file that can be uploaded (using the upload application as earlier explained). Ingesting is the process of capturing content into the media services platform 101 and can occur locally or remotely with respect to the platform 101. If uploaded, the user delivers the project to selected hot folders that automatically define categorization.

The media is then edited, per step 203. By way of example, the user, utilizing the proxy editor player 128 (which is the counterpart software to the proxy editor supported by the media services platform 101) on the workstation 127, can select and log the feed (assuming a live feed which is always visible), either marking in and out points manually or using an auto-clip feature for rapid logging. The user can also insert commentary and assign a rating to the video for determining which segment of the content is the most compelling content, thereby providing an indication of the selected clips that should be edited. During or after logging, the user can select clips from the log and use the proxy editor player to trim the selection. For example, the user can jog and shuttle along a timeline, or utilize a mouse wheel to scroll frame by frame to the desired cut point. The user can then preview the selection before placing it on the edit timeline. Thereafter, the user can manipulate the clips on the timeline, reorder and trim the selections. The proxy editor player 128 can permit the user to apply zoom and crop effects to close in on areas of interest; this capability is particularly valuable for broadband or mobile outputs where detail is important. The user can record a voiceover directly onto the timeline, thereby completing the edit.

The edit is then rendered, as in step 205, as part of a workflow. In an exemplary embodiment, the edit is rendered using a high-resolution MPEG-2 master. Alternatively, an associated EDL is delivered to an integrated craft edit for completion. The media services platform 101 can support various workflows for craft editor integration, such as, store and forward, and instant editing. As for the store and forward approach, the content can be viewed, logged and edited using the proxy editor into packages for automated transcoding (from master MPEG-2) and delivery to popular non-linear editing systems (e.g., AVID Unity and AVID Media Composer, Adobe Premiere, Apple Final Cut Pro, Media 100, iFinish, Pinnacle Liquid and Vortex). With respect to instant editing, using the proxy editor player 128, the user can execute an ingest of a live feed, which can be viewed, logged and edited. The user can then export an EDL to a craft editor, which can be a third party craft editor (e.g., Incite Editor E3) that is integrated with the media services platform 101. When imported into Incite, the timeline is rebuilt frame-accurately, pointing to the MPEG-2 master on the shared SAN 104. Once the edit is complete, the craft editor creates a new MPEG-2 digital master, which is automatically re-ingested back into the platform 101 when dropped in an appropriate Hot Folder.

It is noted that the above process can occur while the video feeds are still being recorded, thus enabling the quickest possible turnaround of content for broadcast programs (e.g., sports and news).

In step 207, metadata is added. The file is transcoded (per step 209) and reviewed and/or approved (step 211). Thereafter, the edited filed is delivered, per step 213. The last stage in the workflow is the delivery of content files and metadata to other systems (e.g., networks 133, 135, and 137) that are responsible for delivery of content to consumers. The syndication application of the media services platform 101 provides the automated delivery of the content and metadata. The media services platform 101 operates on a "set it and forget it" principle. In other words, once a configuration is specified, no other input is required thereafter. For instance, a configuration of a new subscription is set to the required content categories, the technology used to create each file as well as the specific set of parameters are specified, and the file-naming conventions and delivery details are indicated. Every subsequent delivery from the workflow application simply implements the subscription when the correct criteria are met. Whenever the user requires a new output format, the user can specify the various configuration parameters, including the codec, frame rate, frame size, bit rate, and encoder complexity.

It is noted that any technology plugged into the workflow system 113 can be automated—e.g., for pre-processing, transcoding, DRM protection, watermarking, delivery, or any other purpose required.

The above workflow process can be illustrated in the following example involving a sports production. Under this scenario, a customer produces, on a weekly basis for instance, multiple fully-edited football match highlights every week for mobile operators (utilizing Third Generation/Universal Mobile Telecommnunications System (3G/UMTS) technologies). The customer requires a two minute voiced highlight package be delivered to the operators within 4 minutes of the end of each game for these concurrent matches. This requirement can be achieved with the media services platform 101, whereby live broadcast feeds are recorded using the video servers 105. Producers edit and log the media using the proxy editor application (e.g., player 128) during recording of the matches. Once the matches are over, they simply select a deliver button presented by the proxy editor player 128. The workflow system 113 automatically renders the proxy edit using, for instance, a MPEG-2 50 Mbps I-frame master, before automatically transcoding the edit into the mobile formats requested by the operators and delivering the content and metadata XML to their content distribution networks. In this manner, the mobile subscribers can purchase and view the video clips on their mobile handsets within minutes of the end of each game.

According to an exemplary embodiment, the media services platform 101 can be integrated with a newsroom computer system and playout video server. The video server 105 ingests content from live feeds or tape, and journalists and producers throughout the news organization can instantly start to log and edit the live feeds from their desktop using the proxy editor player 128. Finished edits are rendered and transcoded direct from the proxy editor application to a gallery playout video server. Notification is automatically sent to the newsroom computer system and automation system when every new package is available.

Figure 3:
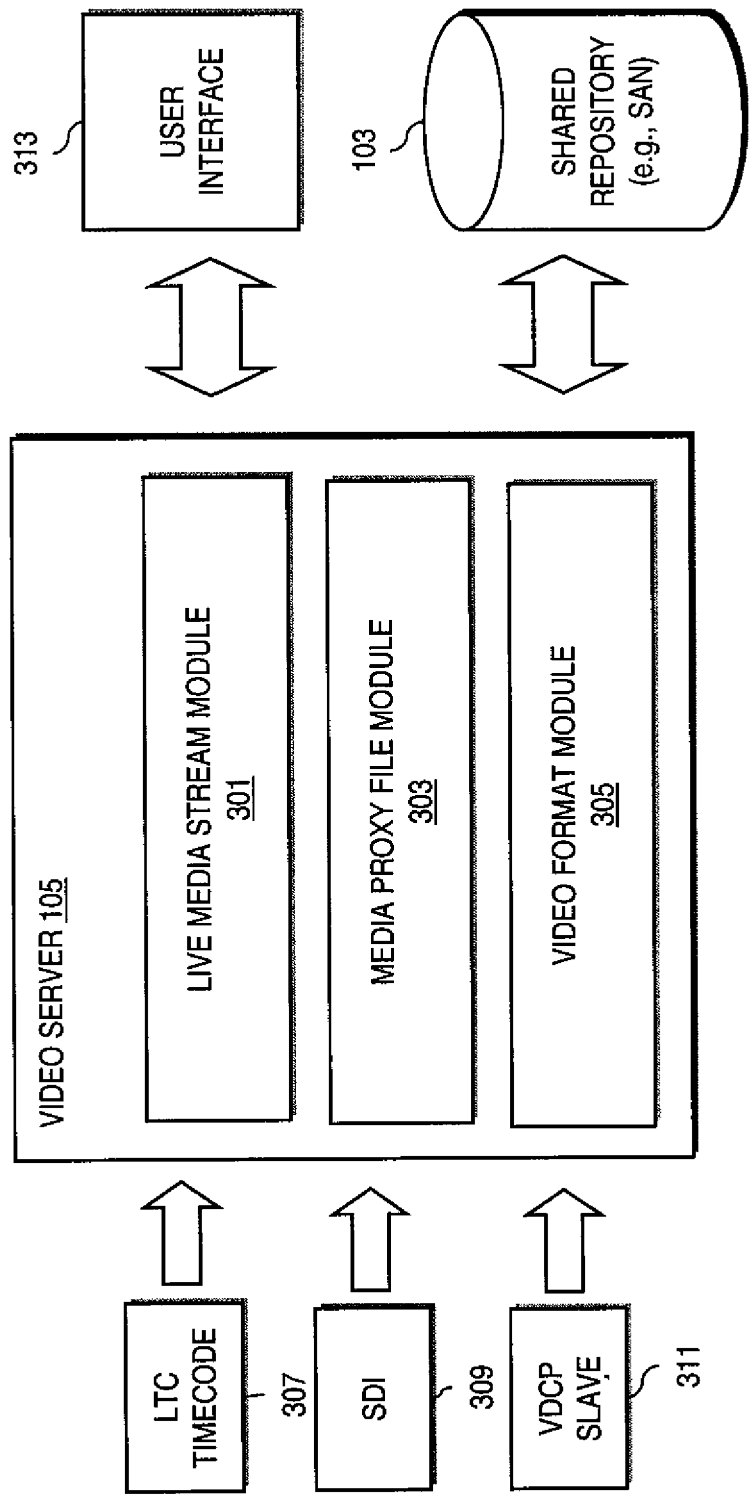
FIG. 3 is a function diagram of a video server in the system of FIG. 1, according to an exemplary embodiment.

FIG. 3 is a function diagram of a video server in the system of FIG. 1, according to an exemplary embodiment. As mentioned, the video server 105, among other functions, is capable of handling live broadcast video in a flexible, feature rich and cost-effective manner. In this example, the video server 105 can be slaved by a Video Disk Communications Protocol (VDCP)—compliant automation system. It is noted that the video server 105 can support both National Television System Committee (NTSC) and Phase Alternating Line (PAL) standards. The video server 105 is controllable from any user workstation (e.g., workstation 127) without geographical constraint. The video server 105 can in turn control, for instance, an attached video tape recorder (VTR) over an RS-422 interface, thereby allowing frame-accurate recording and lay back to tape, and preserving timecode through the entire process.

In an embodiment, the video server 105 includes a live media stream module 301, a media proxy file module 303, and a video format module 305. The live media stream module 301 communicates with the user interface 313 to provide logging and monitoring functions. The media proxy file module 303 supports the capability to perform editing functions during recording of the video. The video format module 305 converts a raw video stream into a standardized format—MPEG-2, for example. The modules 303 and 305 interface the repository 104 to store the ingested contents.

As shown, the server 105 can support various input sources: an LTC time code source 307, a Serial Digital Interface (SDI) source 309, and a VDCP slave source 311. The video server 105 can generate multiple outputs in real-time from the SDI source 307, in contrast to conventional video servers which generate only a single output. The modules 301, 303, 305 generate three types of outputs. One output is that of MPEG-2, in which the user can select between long-GOP and I-frame for each server, ranging from DVD-quality 5 Mbps long-GOP to 50 Mpbs I-frame only. The audio is captured at 48 kHz, for instance. The live media stream module 301 can generate a live media stream (e.g., Windows Media Series) for broadcast over a network (e.g., networks 133-137 of FIG. 1) to one or more media servers (e.g., media server 121), which serve the stream on to individual user workstations. The stream can include SMPTE timecode, thereby providing a frame-accurate source for live logging.

Finally, the media proxy file module 303 can produce a file (e.g., Windows Media proxy file) for storage in the SAN 104. The proxy editor permits this file, according to an embodiment, to be opened for viewing and editing while the file is still being written. Thus, in conjunction with the proxy editor, the video server 105 supports fast-turnaround production of live events without the need for dedicated high-bandwidth networks and expensive edit suites, and without sacrificing quality or functionality.

In addition to the robust video editing functionality, the media services platform 101 provides a collaborative environment whereby frame synchronization of proxies is maintained across multiple formats, as next explained.

Figure 4:
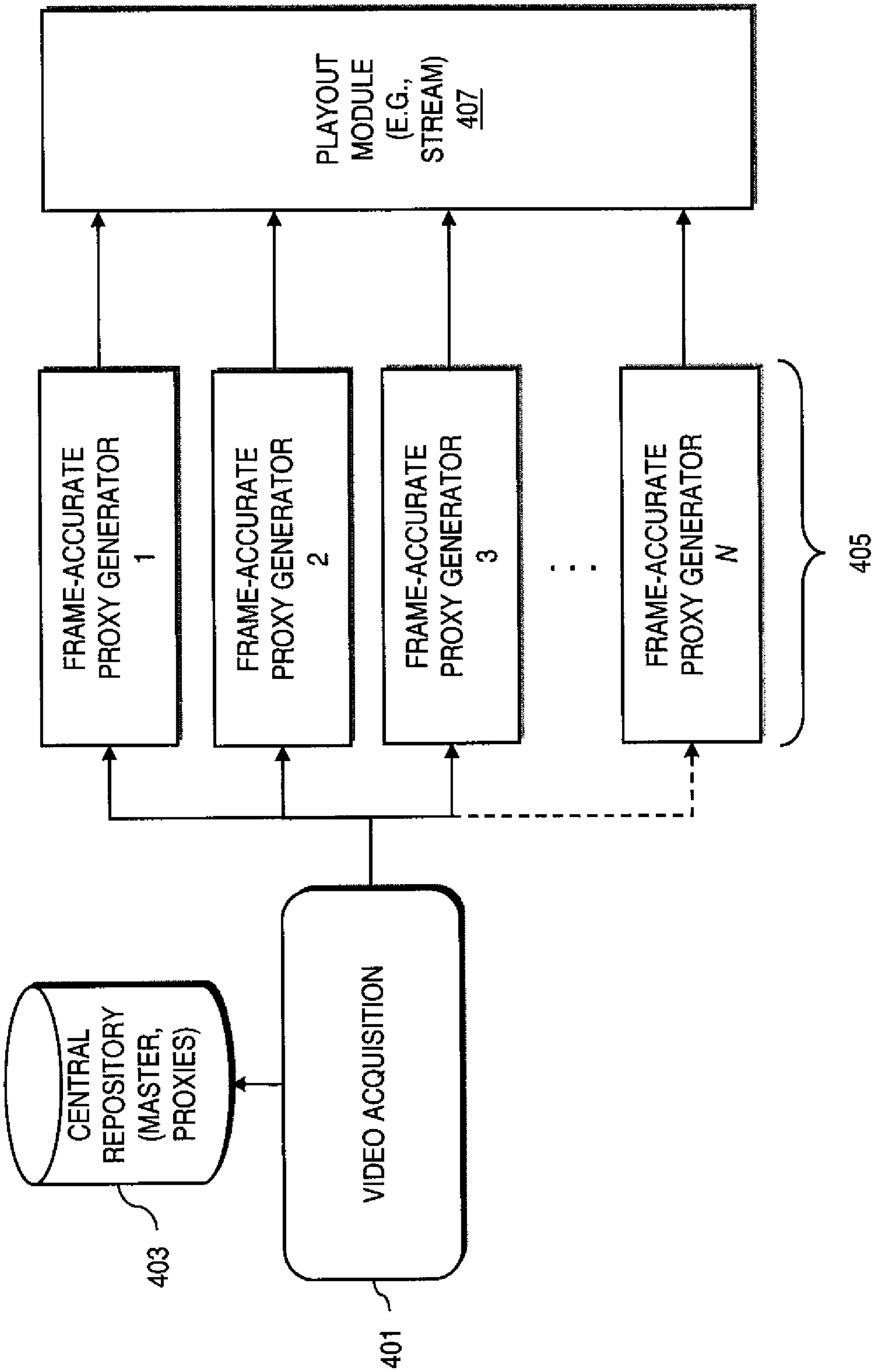
FIG. 4 is a diagram of system for generating frame-accurate proxies, according to an exemplary embodiment.

FIG. 4 is a diagram of system for generating frame-accurate proxies, according to an exemplary embodiment. Under this scenario, a video acquisition module 401 can generate a hi-fidelity (or high resolution) video master from a video feed, such as a live broadcast feed. The master can be stored in a central repository 403, serving as an archive for masters as well as the associated video proxies. The module 401 also provides the video master to one or more proxy generators 405. Each of the proxy generators 405 can produce frame-accurate video proxies from the video master. The video proxies, in an exemplary embodiment, are low-resolution proxies having a variety of media formats. The particular format depends on the application and/or device that is to display the video proxy; other factors that dictate the type of format include bandwidth, communication protocol/technologies, etc. By way of example, the number of proxy generators 405 can be determined by the types of media that is supported, wherein each of the generators can correspond to a different media format. The outputs of the proxy generators 405, in an exemplary embodiment, can be sent to a playout module 407 for playing out the proxies as streams (e.g., MPEG, or other media streams).

Figure 5:
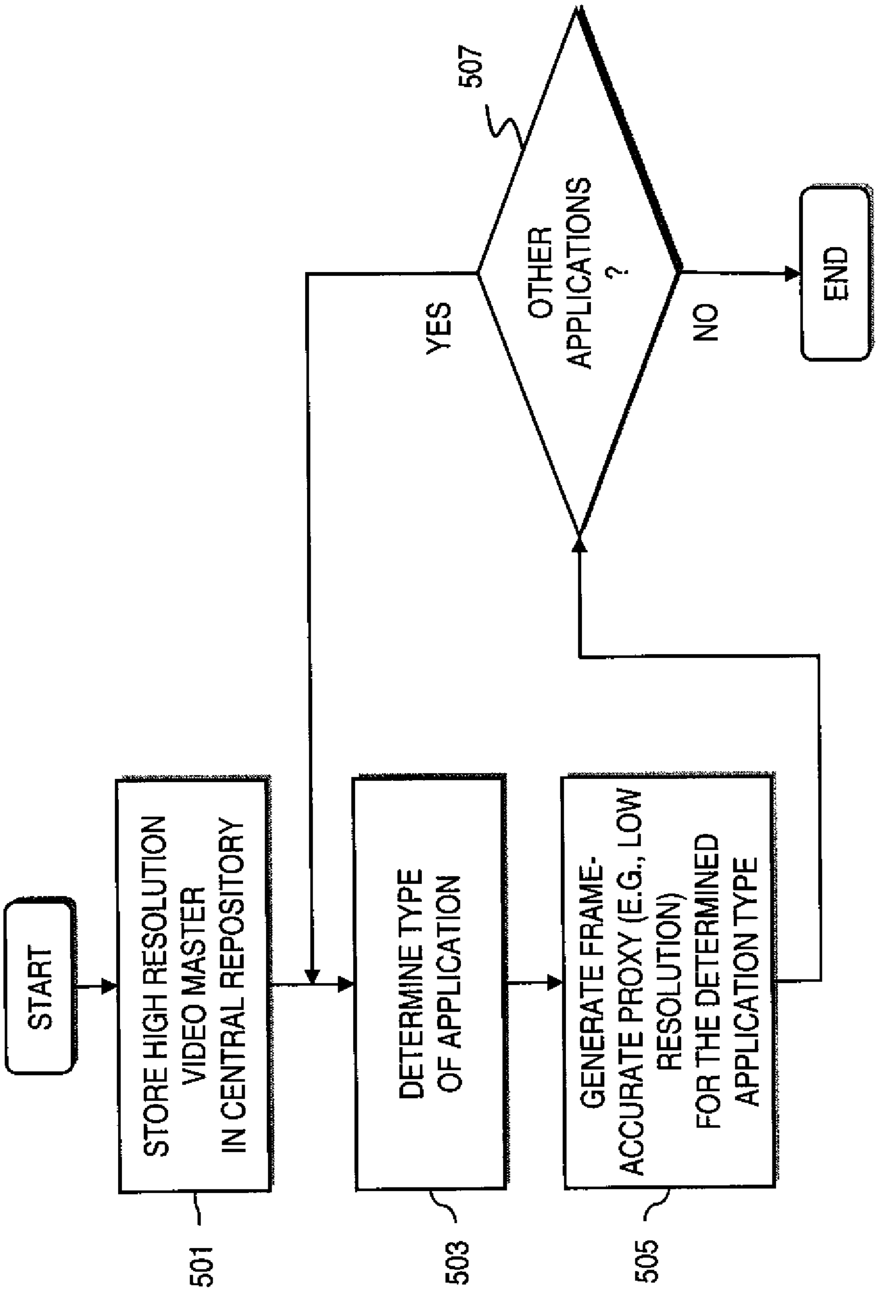
FIG. 5 is a flowchart of a process for generating proxies of different formats depending on the applications, according to an exemplary embodiment.

FIG. 5 is a flowchart of a process for generating proxies of different formats depending on the applications, according to an exemplary embodiment. In step 501, a high resolution video master is stored in the central repository 403. Next, the type of application that will be displaying the video proxy is determined, per step 503. The appropriate frame-accurate proxy generator (e.g., 1 . . . N) is invoked to produce a proxy that is compatible with the determined application. If other applications are to be supported (as determined in step 507), steps 503 and 505 are repeated.

The above arrangement provides a foundation for collaboration among different applications resident on different devices (e.g., a mobile phone, a laptop computer, a desktop computer, a personal digital assistant (PDA), or a combination thereof), as next described.

Figure 6:
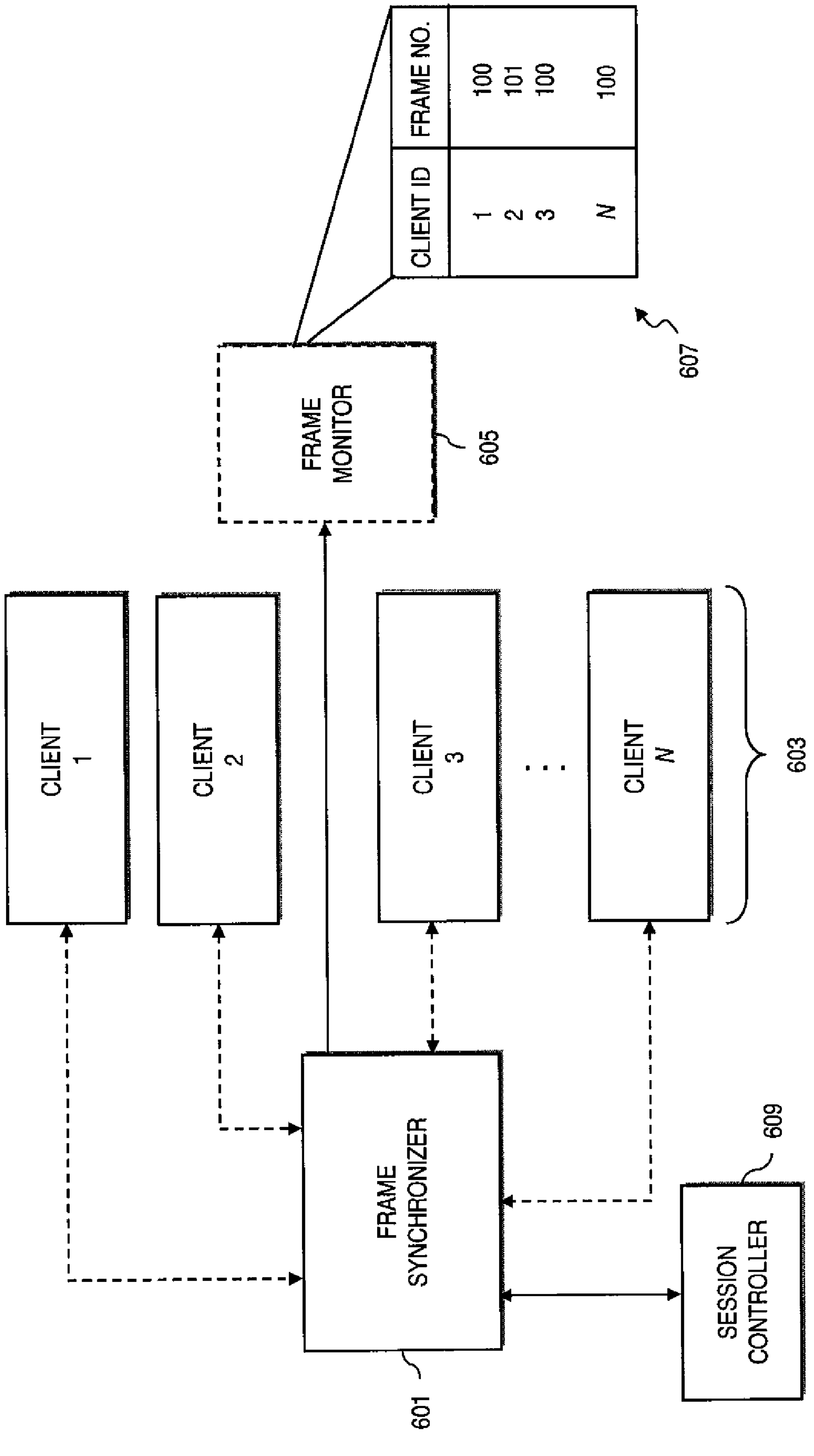
FIG. 6 is a diagram of a frame synchronizer capable of supporting a collaborative environment, according to an exemplary embodiment.

FIG. 6 is a diagram of a frame synchronizer capable of supporting a collaborative environment, according to an exemplary embodiment. A frame synchronizer 601, in this example, communicates with one or more clients 603 (or applications). The frame synchronizer 601 includes a frame monitor function 605 to track frame information for the video proxies of the respective clients 603. In an exemplary embodiment, a table 607 includes a field for identification of the client (e.g., Client ID) and associated field specifying the frame number. As shown, clients 1, 3 and N are at frame number 100, while client 2 is at frame number 101. Depending on which client is designated as the lead i.e., controls the collaboration, the frame synchronizer 601 can synch up the frames of the video proxies to frame number 100 or frame number 101. For example, if client 2 is the lead, then the frame synchronizer 601 would update the frame of the other clients to frame 101.

The update process for distributing the frame information can be a broadcast or multicast message to the clients 603. Alternatively, the frame information can be unicast to the appropriate clients 603.

Furthermore, a session controller 609 manages video sessions to permit mid-stream device changes, whereby a user can view video content and during the viewing session change to another client (or device). The session controller 609 can obtain information on "presence" of the clients 603. The session controller 609, in conjunction with the frame synchronizer 601, preserves the continuity of the playback in a seamless fashion. This process is detailed later with respect to FIG. 10.

Figure 7:
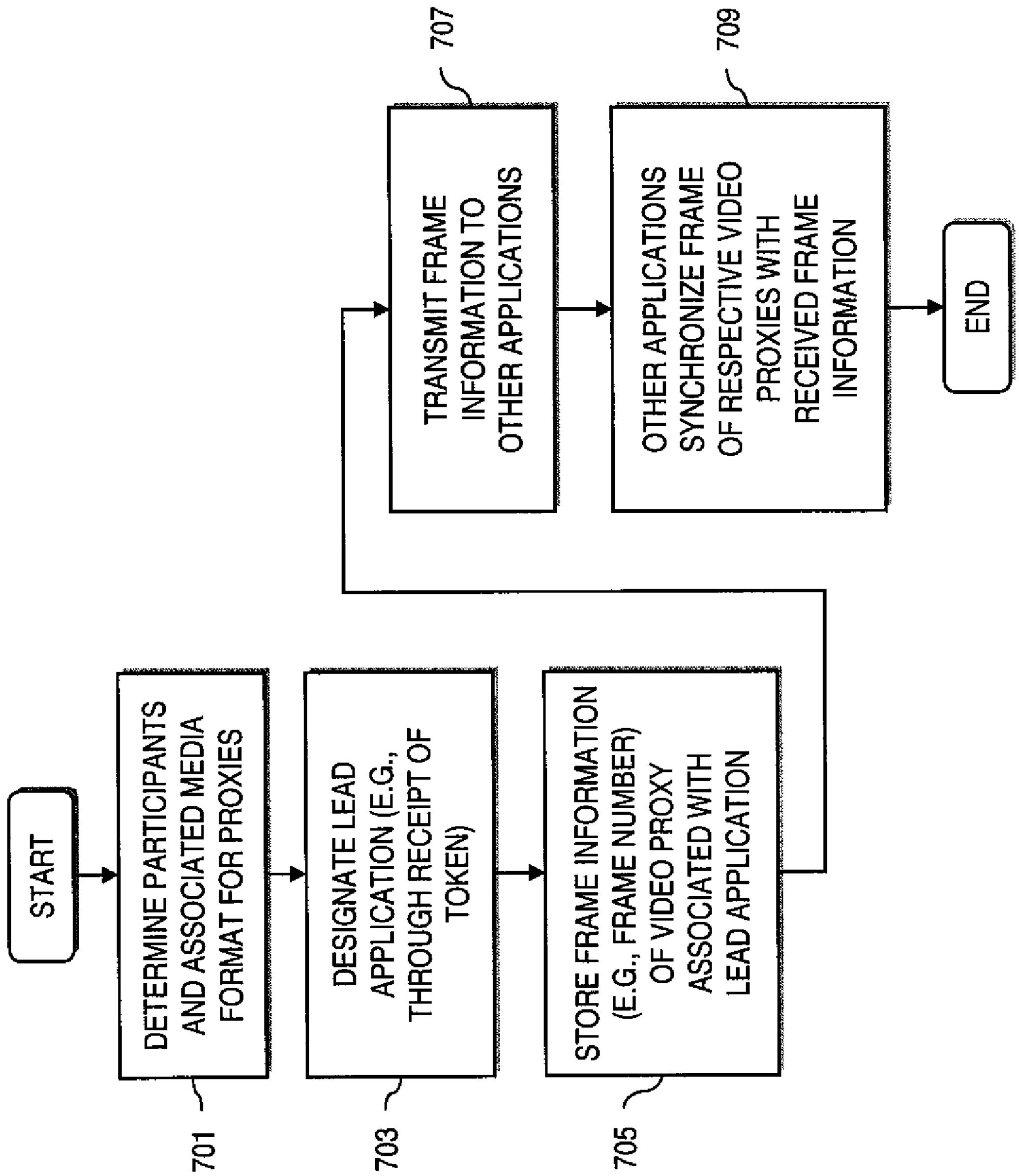
FIG. 7 is a flowchart of a process for synchronizing proxies of different formats depending on the applications, according to an exemplary embodiment.

FIG. 7 is a flowchart of a process for synchronizing proxies of different formats depending on the applications, according to an exemplary embodiment. Initially, the process determines the participants and their media format requirements, as in step 701. In step 703, a lead participant is designated. Such designation can be performed using a token passing mechanism, whereby a user can be the recipient of a token if the user indicates so by an action that is predefined.

Upon receipt of the token, the user becomes the controller of the collaborative session, such that the video proxy of this user is the lead for frame synchronization purposes. Thus, in step 705, the frame information of the lead user is stored. The frame information is then transmitted to the other applications for frame synchronization, as in steps 707 and 709.

Figure 8:
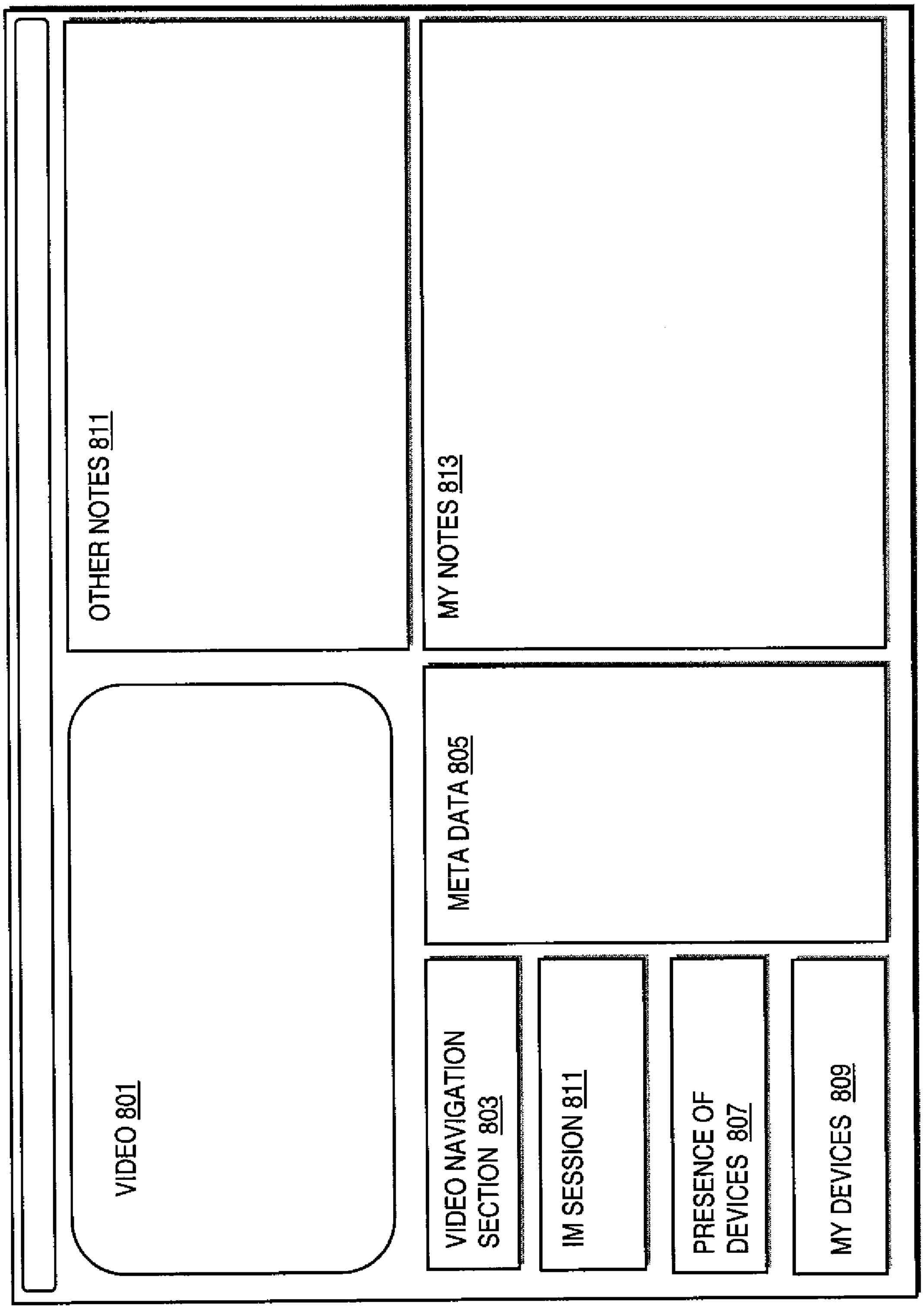
FIG. 8 is a diagram of an exemplary graphical user interface (GUI) for participating in a collaborative session, according to an exemplary embodiment.

FIG. 8 is a diagram of an exemplary graphical user interface (GUI) for participating in a collaborative session, according to an exemplary embodiment. In this exemplary GUI 800, a video section 801 is provided to display the video proxy. A video navigation section 803 is provided to permit the user to control the playback of the video proxy; e.g., stop, pause, fast forward, review, chapter selection, etc. A section 805 is supplied to specify any metadata associated with the video proxy. A section 807 allows the user to view their registered devices that are currently online. Another section 809 provides the user with the ability to customize the user interface through selection of available "applications" that can be added to the interface 800.

In addition, the GUI 800 provides for a user to initiate an instant communication session (e.g., Instant Messaging (IM)) with other participants of the session using an IM session box 811. Furthermore, it is contemplated that the user may wish to take notes about the video; this can be accomplished using text box 813 ("My Notes" section). The user may also view the notes from other users with text box 815 ("Other Notes" section).

It is recognized that any variation of the above sections within the GUI 800 can be used to tailor the interface for the particular application and/or device.

Figure 9:
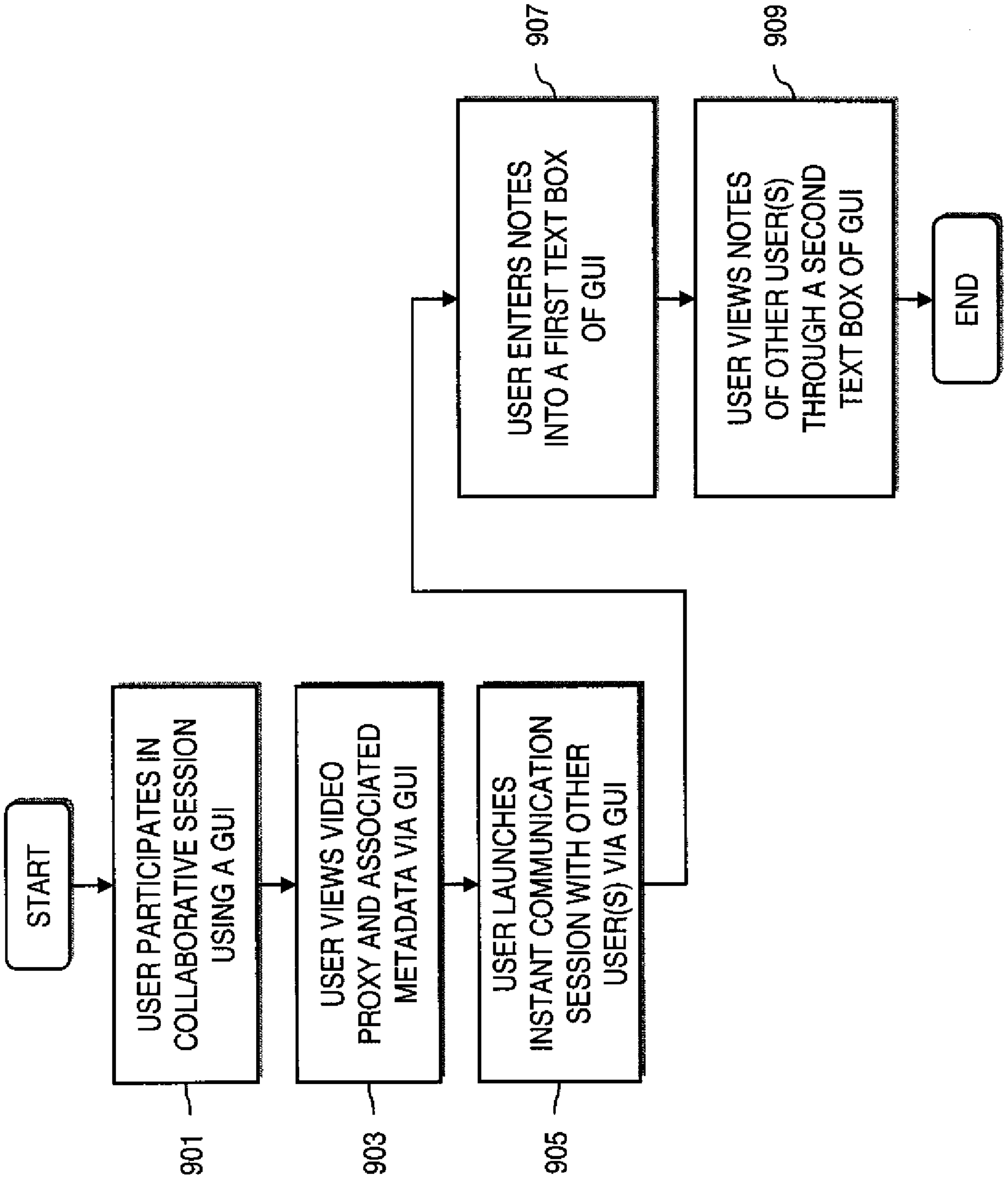
FIG. 9 is a flowchart of a process for using the GUI of FIG. 8 to collaborate across multiple applications and devices, according to an exemplary embodiment.

FIG. 9 is a flowchart of a process for using the GUI of FIG. 8 to collaborate across multiple applications and devices, according to an exemplary embodiment. The GUI 800 is invoked for the user to participate in a collaborative session, per step 901. The user can view, per step 903, the video proxy within the section 801 as well as metadata within section 805. During the playback of the video, the user can launch an IM session, as in step 905. Further, the user can provide descriptive text about the video within the text box 809, and view commentary from other users at text box 811 (steps 907 and 909).

Figure 10:
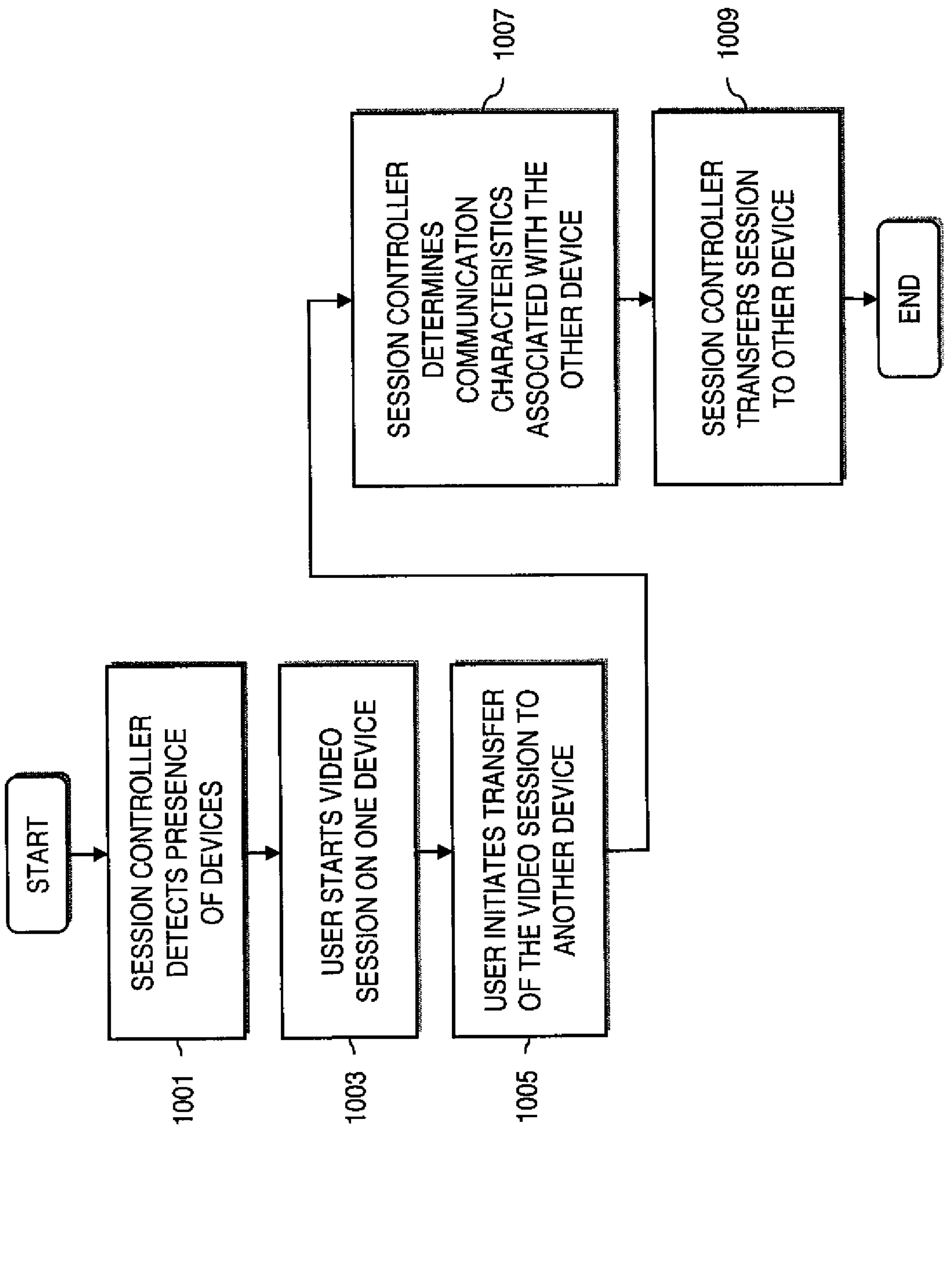
FIG. 10 is a flowchart of a process for maintaining a video session during mid-stream device change, according to an exemplary embodiment.

FIG. 10 is a flowchart of a process for maintaining a video session during mid-stream device changes, according to an exemplary embodiment. In step 1001, the process automatically detects presence of devices (e.g. clients 603 of FIG. 6) associated with the users who come online. The user starts a video session on one of the device, as in step 1003. The user can subsequently transfer the video session from one device to any registered device that is now online, per step 1005. The process automatically determines the best communication characteristics (e.g., frame rate, aspect ratio, etc) and transfers the session to the new device (steps 1007 and 1009).

In an exemplary embodiment, this process also allows the user to use one device as a "master," whereby other users can participate in a collaborative session. The master device can serve as an editor; the session can be displayed on the other devices as a "viewer." For instance, the user may initiate a collaborative session on a mobile phone and move the session from the mobile phone to a desktop or vice versa. In this transfer, the user can choose to transfer the session at an exact point (or frame) from the original device for precise continuity.

The above described processes relating to frame synchronization and collaboration may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
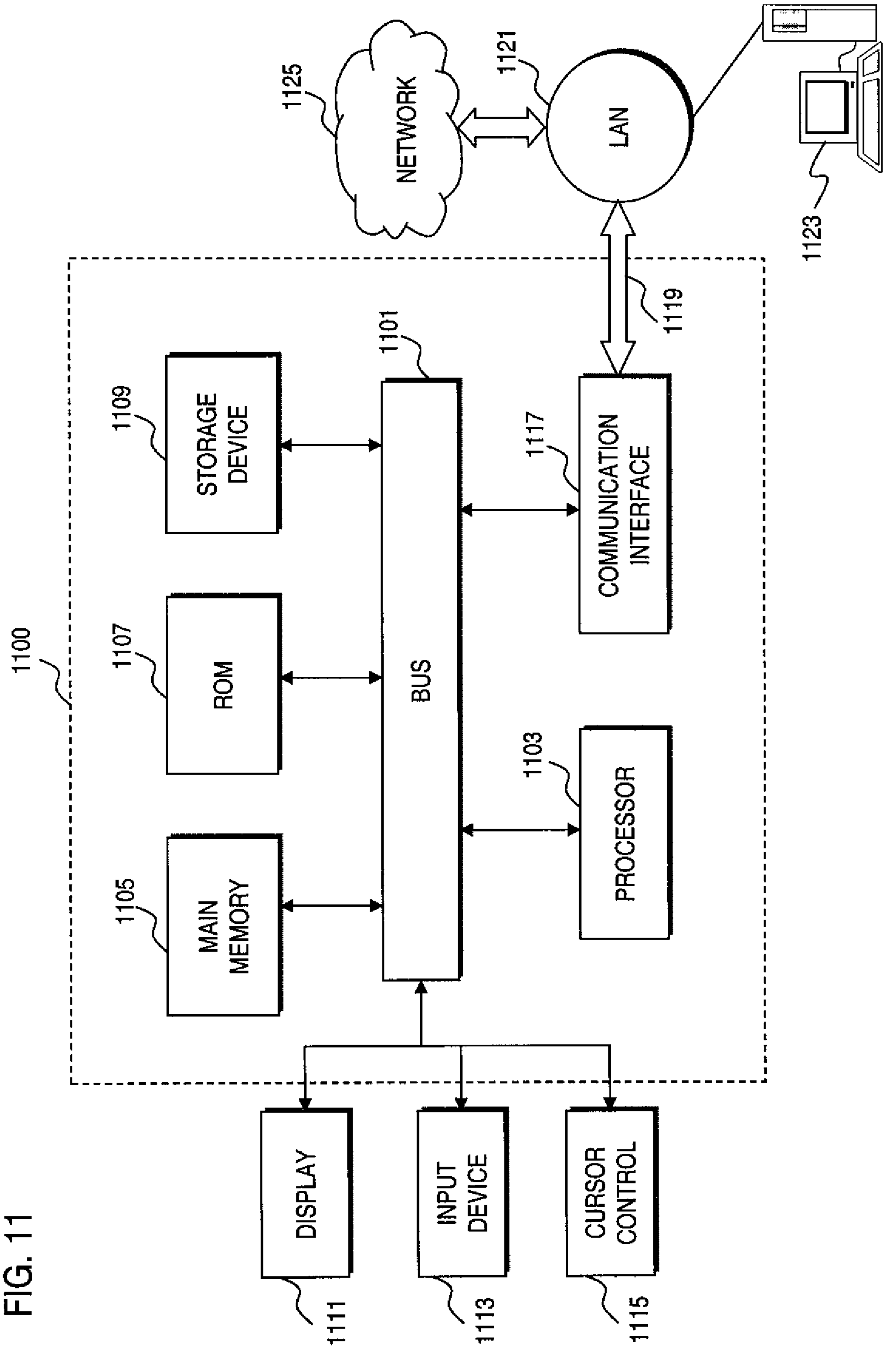
FIG. 11 is a diagram of a computer system that can be used to implement various exemplary embodiments.

FIG. 11 illustrates a computer system 1100 upon which an exemplary embodiment can be implemented. For example, the processes described herein can be implemented using the computer system 1100. The computer system 1100 includes a bus 1101 or other communication mechanism for communicating information and a processor 1103 coupled to the bus 1101 for processing information. The computer system 1100 also includes main memory 1105, such as a random access memory (RAM) or other dynamic storage device, coupled to the bus 1101 for storing information and instructions to be executed by the processor 1103. Main memory 1105 can also be used for storing temporary variables or other intermediate information during execution of instructions by the processor 1103. The computer system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computer system 1100 may be coupled via the bus 1101 to a display 1111, such as a cathode ray tube (CRT), liquid crystal display, active matrix display, or plasma display, for displaying information to a computer user. An input device 1113, such as a keyboard including alphanumeric and other keys, is coupled to the bus 1101 for communicating information and command selections to the processor 1103. Another type of user input device is a cursor control 1115, such as a mouse, a trackball, or cursor direction keys, for communicating direction information and command selections to the processor 1103 and for controlling cursor movement on the display 1111.

According to an exemplary embodiment the processes described herein are performed by the computer system 1100, in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement the exemplary embodiment. Thus, exemplary embodiments are not limited to any specific combination of hardware circuitry and software.

The computer system 1100 also includes a communication interface 1117 coupled to bus 1101. The communication interface 1117 provides a two-way data communication coupling to a network link 1119 connected to a local network 1121. For example, the communication interface 1117 may be a digital subscriber line (DSL) card or modem, an integrated services digital network (ISDN) card, a cable modem, a telephone modem, or any other communication interface to provide a data communication connection to a corresponding type of communication line. As another example, communication interface 1117 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1117 sends and receives electrical, electromagnetic, or optical signals that carry digital data streams representing various types of information. Further, the communication interface 1117 can include peripheral interface devices, such as a Universal Serial Bus (USB) interface, a PCMCIA (Personal Computer Memory Card International Association) interface, etc. Although a single communication interface 1117 is depicted in FIG. 11, multiple communication interfaces can also be employed.

The network link 1119 typically provides data communication through one or more networks to other data devices. For example, the network link 1119 may provide a connection through local network 1121 to a host computer 1123, which has connectivity to a network 1125 (e.g. a wide area network (WAN) or the global packet data communication network now commonly referred to as the "Internet") or to data equipment operated by a service provider. The local network 1121 and the network 1125 both use electrical, electromagnetic, or optical signals to convey information and instructions. The signals through the various networks and the signals on the network link 1119 and through the communication interface 1117, which communicate digital data with the computer system 1100, are exemplary forms of carrier waves bearing the information and instructions.

The computer system 1100 can send messages and receive data, including program code, through the network(s), the network link 1119, and the communication interface 1117. In the Internet example, a server (not shown) might transmit requested code belonging to an application program for implementing an exemplary embodiment through the network 1125, the local network 1121 and the communication interface 1117. The processor 1103 may execute the transmitted code while being received and/or store the code in the storage device 1109, or other non-volatile storage for later execution. In this manner, the computer system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of various embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

The following patent applications are incorporated herein by reference in their entireties: co-pending U.S. patent application Ser. No. 11/617,355 filed Dec. 29, 2006, entitled "Method and Apparatus for Providing On-Demand Resource Allocation"; co-pending U.S. patent application Ser. No. 11/617,314 filed Dec. 29, 2006, entitled "Method and System for Providing Remote Workflow Management"; and co-pending U.S. patent application Ser. No. 11/614,400 filed Dec. 29, 2006, entitled "Method and System for Video Monitoring."

What is claimed is:

1. A computer-implemented method performed by one or more processors following coded instructions, the one or more processors causing:

receiving a token that designates a controller of a collaborative session, wherein the collaborative session utilizes a plurality of video proxies corresponding to a video master; and transmitting, to a frame synchronizer, frame information associated with the video proxy corresponding to the controller, wherein the frame synchronizer is configured to update the other video proxies based on the received frame information.

2. The method according to claim 1, wherein each of the video proxies is generated according to a format that is compatible with respective applications configured to display the video proxies.

3. The method according to claim 2, wherein the applications reside respectively on a plurality of communication devices that include a mobile phone, a laptop computer, a desktop computer, a personal digital assistant (PDA), or a combination thereof.

4. The method according to claim 1, further comprising: retrieving the video proxy from a central repository.

5. The method according to claim 1, wherein the video master is output from a live feed.

6. The method according to claim 1, further comprising:

displaying a graphical user interface (GUI), wherein the GUI includes, a section for the video proxy associated with the controller, an instant communication box for conducting an instant communication session with one or more users of the other video proxies, a metadata section for specifying metadata about the video proxy associated with the controller, a first text box for displaying text of the controller, and a second text box for displaying text of one or more users of the other video proxies.

7. An apparatus comprising:

memory;

at least one processor for receiving a token that designates a controller of a collaborative session, wherein the collaborative session utilizes a plurality of video proxies corresponding to a video master; and a communication interface configured to transmit, to a frame synchronizer, frame information associated with the video proxy corresponding to the controller, wherein the frame synchronizer updates the other video proxies based on the received frame information.

8. The apparatus according to claim 7, wherein each of the video proxies is generated according to a format that is compatible with respective applications for displaying the video proxies.

9. The apparatus according to claim 8, wherein the applications reside respectively on a plurality of communication devices that include a mobile phone, a laptop computer, a desktop computer, a personal digital assistant (PDA), or a combination thereof.

10. The apparatus according to claim 7, wherein the at least one processor causes a retrieval of the video proxy from a central repository.

11. The apparatus according to claim 7, wherein the video master is output from a live feed.

12. The apparatus according to claim 7, further comprising:

a display for displaying a graphical user interface (GUI), wherein the GUI includes, a section for the video proxy associated with the controller, an instant communication box for conducting an instant communication session with one or more users of the other video proxies, a metadata section for specifying metadata about the video proxy associated with the controller, a first text box for displaying text of the controller, and a second text box for displaying text of one or more users of the other video proxies.

* * * * *